Figure 1:
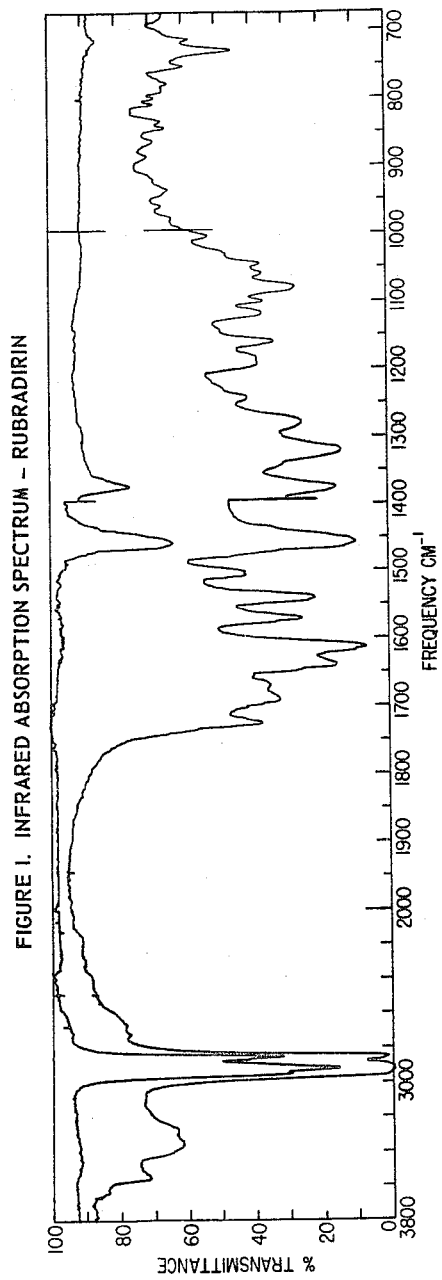

ULTRAVIOLET SPECTRA OF RUBRADIRIN.

United States Patent Office 3,335,057
Patented Aug. 8, 1967

3,335,057
ANTIBIOTIC RUBRADIRIN AND METHOD
OF MAKING SAME
Le Roy E. Johnson, Kalamazoo, Robert M. Smith, Portage Township, Kalamazoo County, Curtis E. Meyer, Galesburg, and Stanley P. Owen, Portage Township, Kalamazoo County, Mich., assignors to The Upjohn Company, Kalamazoo, Mich., a corporation of Delaware
Filed July 3, 1963, Ser. No. 292,657
9 Claims. (Cl. 167—65)

This invention relates to a composition of matter and to a process for the production thereof. More particularly this invention relates to a new compound, rubradirin, and to a process for its production.

The new compound of this invention is an elaboration product of a rubradirin-producing actinomycete. It has the property of adversely affecting growth of various organisms, particularly bacteria, and can be used either as a free acid or as a basic addition salt, alone or in combination with other antibacterial agents, to prevent the growth of or to reduce the number of microorganisms present in various environments, such as in animals, mammals, birds, fish, reptiles, plants and humans where the infecting microorganism is susceptible to the antibiotic. Also, it is useful in wash solution for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays, and other biological media. It can also be used as a feed supplement to promote the growth of animals, for example, mammals, birds, fish, and reptiles. It is distinguished from known antibacterial agents or antibiotics by its characteristic IR and UV spectra, shown respectively in FIGURES I and II; by its antibacterial activity against Staphylococcus and Streptococcus organisms; by its antibacterial activity against *Sarcina lutea*; and by lack of cross-resistance with known antibiotics, among which tested were celesticetin, neamine, neomycin B, neomycin C, erythromycin, tetracycline, penicillin, novobiocin, streptomycin, streptothricin, chloramphenicol, polymyxin, kanamycin, streptozotocin, and carbomycin.

THE MICROORGANISM

The actinomycete used according to this invention for the production of rubradirin has been designated as *Streptomyces achromogenes* var. *rubradiris*. This is a new variety of a known actinomycete. A culture of the living organism has been deposited with the Fermentation Division, Northern Utilization Research Branch, U.S. Department of Agriculture, Peoria, Illinois, and has been added to its permanent collection as NRRL 3061.

This new variety of microorganism is distinctly characterized by the production of a brown pigment when grown in most media, and by the sporophores having open loops. It appears to be a variant of *Streptomyces achromogenes* Waksman No. 3730. The latter organism, however, does not produce rubradirin. This new variety is also very similar to the variant *Streptomyces achromogenes* var. *streptozoticus* but, again, the latter organism does not produce rubradirin.

The utilization of carbon compounds by variants of *Streptomyces achromogenes* in a synthetic medium is shown below in Table I.

TABLE I.—ASSIMILATION OF CARBON COMPOUNDS IN SYNTHETIC MEDIUM*

| Carbon Source | Streptomyces achromogenes | | | | | |
|---|---|---|---|---|---|---|
| | Var. rubradiris | | Var. streptozoticus | | Waksman No. 3730 | |
| D-Xylose | (+) | (+) | + | + | + | (+) |
| L-Arabinose | + | + | + | + | + | + |
| Rhamnose | + | + | + | (+) | + | (+) |
| D-Fructose | + | + | + | + | + | + |
| D-Galactose | + | + | + | + | + | + |
| D-Glucose | + | + | + | + | + | + |
| D-Mannose | + | + | + | + | + | + |
| Maltose | (−) | + | + | (−) | + | + |
| Sucrose | (−) | (+) | (−) | (−) | (−) | (+) |
| Lactose | + | (+) | + | (+) | + | (+) |
| Cellobiose | + | (+) | (+) | + | + | (+) |
| Raffinose | (+) | (+) | (+) | (−) | (−) | (+) |
| Dextrin | + | + | (+) | + | + | + |
| Inulin | (−) | (+) | (−) | + | (−) | (−) |
| Soluble Starch | + | + | (+) | + | + | + |
| Glycerol | + | + | (−) | − | (−) | (+) |
| Dulcitol | (−) | (+) | | | | |
| D-Mannitol | + | + | (+) | (+) | (+) | (+) |
| D-Sorbitol | (+) | (+) | (+) | − | (+) | (+) |
| D-Inositol | (−) | (+) | (−) | (+) | (+) | (+) |
| Salicin | (−) | (+) | (+) | | | (+) |
| Sodium Formate | (−) | (+) | − | − | (−) | (+) |
| Sodium Oxalate | (−) | (−) | − | − | − | (+) |
| Sodium Tartrate | (−) | (−) | − | − | (−) | (+) |
| Sodium Salicylate | | | | | | |
| Sodium Acetate | (+) | (+) | (+) | (+) | + | + |
| Sodium Citrate | (+) | (+) | (+) | (+) | + | + |
| Sodium Succinate | (+) | (+) | (+) | (+) | + | + |
| Control | (−) | (+) | − | − | (−) | (+) |

+=Positive assimilation; (+)=Positive assimilation, slight growth; (−)=No assimilation, slight growth; −=No growth.
*Pridham, T. G., and Gottlieb, D., "Assimilation of Carbon Compounds in Synthetic Medium," J. Bact. 56; 107–114, 1948.

Table II shows the macroscopic appearance of variants of *Streptomyces achromogenes* on various media in slanted tubes as viewed from the surface and from the under side (reverse).

pancreatic digest of casein, distillers' solubles, animal peptone liquors, meat and bone scraps, and the like. Combination of these carbon and nitrogen sources can be used advantageously. Trace metals, for example, zinc,

TABLE II.—MACROSCOPIC APPEARANCE, EKTACHROME SLIDES*

| Medium | *Streptomyces achromogenes* | | | | | |
|---|---|---|---|---|---|---|
| | Var. rubradiris | | Var. streptozoticus | | Waksman No. 3730 | |
| | Surface | Reverse | Surface | Reverse | Surface | Reverse |
| Bennett's | Gray | Brown | Gray | Brown | Gray | Brown. |
| Czapek's Sucrose | do | Tan | do | Tan | do | Tan. |
| Maltose Tryptone | Gray white | Brown | Gray white | Brown | Gray white | Brown. |
| Peptone-Iron | No aerial growth. | do | No aerial growth. | do | No aerial growth. | Do. |
| 0.1 percent Tyrosine | Gray white | do | Gray white | do | Gray white | Do. |
| Casein starch | Gray | do | Gray | do | Gray | Do. |

*Dietz, A., Ektachrome Transparencies as Aids in Actinomycete Classification, Annals of the N.Y. Academy of Science 60: 152–154, 1954.

The growth and morphological characteristics of variants of *Streptomyces achromogenes* are shown below in Table III.

magnesium, manganese, cobalt, iron, and the like need not be added to the fermentation media since tap water and unpurified ingredients are used as media components.

TABLE III.—GROWTH CHARACTERISTICS IN VARIOUS MEDIA, AS READ AFTER SEVEN DAYS

| Agar Medium | *Streptomyces achromogenes* | | |
|---|---|---|---|
| | Var. rubradiris | Var. streptozoticus | Waksman No. 3730 |
| Peptone-iron | Pale gray aerial growth. Hydrogen sulfide darkening. | Pale gray aerial growth. Hydrogen sulfide darkening. | Pale gray aerial growth. Hydrogen sulfide darkening. |
| Calcium malate | Gray aerial growth. Gray reverse. Malate not solubilized. | Pale gray aerial growth. Gray reverse. Malate not solubilized. | Gray aerial growth. Gray reverse. Malate slightly solubilized under growth. |
| Glucose asparagine | Gray-white aerial growth. Yellow-tan reverse. Yellow-tan pigment. | Trace gray-white aerial growth. Pale yellow reverse. No pigment. | Trace gray aerial growth. Pale yellow reverse. No pigment. |
| Skim milk | Gray aerial growth on periphery. Yellow-tan reverse. Yellow-tan pigment. Casein not solubilized. | No aerial growth. Yellow-tan reverse. Yellow-tan pigment. Casein not solubilized. | Trace gray aerial. Yellow-tan reverse. Yellow-tan pigment. Casein not solubilized. |
| Xanthine | Cream aerial growth. Yellow reverse. Yellow pigment. Xanthine slightly solubilized. | Pale gray aerial growth. Yellow reverse. Yellow pigment. Xanthine slightly solubilized. | Pale gray aerial growth. Yellow reverse. Yellow pigment. Xanthine slightly solubilized. |
| Tyrosine | Cream aerial growth. Brown reverse. Tan pigment. Tyrosine solubilized. | Pale gray aerial growth. Brown reverse. Tan pigment. Tyrosine solubilized. | Cream aerial growth. Brown reverse. Tan pigment. Tyrosine solubilized. |
| Bennett's | Gray-white aerial growth. Yellow-tan reverse. Yellow-tan pigment. | Gray aerial growth. Tan reverse. Tan pigment. | Gray-white aerial growth. Tan reverse. Tan pigment. |
| Czapek's sucrose | Gray aerial growth. Gray reverse | Gray aerial growth. Gray reverse | Gray aerial growth. Gray reverse. |
| Maltose tryptone | Gray-white aerial growth. Yellow-tan reverse. Yellow-tan pigment. | Gray aerial growth. Yellow-tan reverse. Yellow-tan pigment. | Gray aerial growth. Yellow-tan reverse. Yellow-tan pigment. |

The colors on Bennett's and Maltose tryptone agars correspond to the following chips from Jacobson, R., et al., Color Harmony Manual, Container Corporation of America, 3rd Edition, 1948: Aerial growth—3 fe, aqua gray: Reverse—2 le, mustard, old gold, 4 pi, oak brown, russet brown; Pigment—3 pi, golden brown, tobacco brown.

The microscopic characteristics of variants of *Streptomyces achromogenes* are shown below in Table IV.

Production of the compound of the invention can be effected at any temperature conducive to satisfactory

TABLE IV.—MICROSCOPIC CHARACTERISTICS

| | *Streptomyces achromogenes* | | |
|---|---|---|---|
| | Var. rubradiris | Variant 128 | Waksman No. 3730 |
| Light Microscope | Open loops | Open loops | Open loops. |
| Electron Microscope Touch Preparation. | Smooth spores, oval to oblong with good segmentation between spores. | Smooth spores, oval to oblong with good segmentation between spores. | Smooth spores, oval to oblong with good segmentation between spores. |
| Carbon Repligraph | Oval spores with fine surface detail of the basket weave type. | Oval spores with fine surface detail of the basket weave type. | Oval spores with fine surface detail of the basket weave type. |

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, lactose, dextrin, molasses, and the like. Preferred nitrogen sources include corn steep liquor, yeast, autolyzed brewer's yeast with milk solids, soybean meal, cottonseed meal, corn meal, milk solids, growth of the microorganism, for example, between about 18° and 40° C. and preferably between about 26° and 30° C. Ordinarily, optimum production of the compound is obtained in about 2 to 10 days. The medium normally stays fairly close to neutral, or on the alkaline side during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

A variety of procedures can be employed in the isolation and purification of rubradirin, for example, solvent extraction, liquid-liquid distribution in a Craig apparatus, the use of adsorbents, and crystallization from solvents. Solvent extraction procedures are preferred for commercial production inasmuch as they are less time consuming and less expensive, and higher recovery yields are obtained thereby.

In a preferred process, rubradirin is recovered from its culture medium by separation of the mycelia and undissolved solids by conventional means such as by filtration or centrifugation. The antibiotic is then removed from the filtered or centrifuged broth by extraction. For the extraction of rubradirin from the filtered broth, solvents hereinafter listed can be used. Methylene chloride is the preferred extraction solvent. The extract obtained by methylene chloride extraction can be evaporated to dryness to provide the crude antibiotic directly. Preferably, however, the organic solvent extracts are processed further to obtain more purified forms of the antibiotic.

Alternatively, rubradirin can be isolated and purified from the culture medium by use of strongly basic anion exchange resins. Suitable anion exchange resins for this purpose are obtained by chloromethylating by the procedure given on pages 88 and 97 of Kunin, Ion Exchange Resins, 2nd ed. (1958), John Wiley and Sons, Inc., polystyrene crosslinked, if desired, with divinylbenzene prepared by the procedure given on page 84, of Kunin, supra, and quaternizing with trimethylamine, or dimethylethanolamine by the procedure given on page 97 of Kunin, supra. Anion exchange resins of this type are marketed under the tradenames Dowex 2, Dowex 2-X8, Dowex 8, Amberlite IRS-400, Duolite A-102, and Permutit S-1.

As a further alternative, rubradirin can be recovered from the filtered culture medium or the organic extract by adsorption chromatography by employing such adsorbents as silicic acid, alumina, and Florisil (a synthetic silicate of the type described in U.S. Patent No. 2,393,625 and sold by the Floridin Company). The adsorbed antibiotic can be removed from the adsorbent in relatively pure form by elution with a suitable organic solvent, e.g., one of those hereinafter mentioned in which rubradirin is soluble.

The new compound of the invention, rubradirin, gives a red color in acid solution, and a green color in alkaline solution. Accordingly, rubradirin can be used as a pH indicator.

The novel compound of the invention is soluble in water-immiscible polar organic solvents, for example, ethyl acetate, amyl acetate, butyl acetate, and like aliphatic esters; 1-butanol, 2-butanol, and like aliphatic alcohols; methyl ethyl ketone, methyl iso-butyl ketone, and like alkanones; chloroform, methylene chloride and like halogenated hydrocarbons; water-miscible organic solvents, for example, methanol, ethanol, and like alcohols; and hydrocarbon solvents, for example, benzene and toluene; and is relatively insoluble in water.

Salts of rubradirin are formed employing the free acid of rubradirin and an inorganic or organic base. The rubradiin salts can be prepared as for example by suspending rubradirin free acid in water, adding a dilute base until the pH of the mixture is about 7 to 8, and freeze-drying the mixture to provide a dried residue consisting of the rubradirin salt. Rubradirin salts which can be formed include the sodium, potassium, and calcium. Other salts of rubradirin including those with organic bases such as primary, secondary, and tertiary mono-, di- and polyamines can also be formed using the above-described or other commonly employed procedures.

The new compound of the invention, rubradirin, inhibits the growth of the following Gram-positive bacteria: *Staphylococcus aureus, Diphlococcus pneumoniae, Streptococcus pyogenes, Streptococcus faecalis, Clostridium perfringens, Clostridium tetani*; and has marginal activity against the following Gram negative microorganisms: *Alcaligenes faecalis, Pasteurella boviseptica, Proteus morganii,* and *Shigella flexneri*. Accordingly, the new compound can be used as a disinfectant on various dental and medical equipment contaminated with *Staphylococcus aureus*; it can also be used as a disinfectant on washed and stacked food utensils contaminated with this organism and the organism.

*Streptococcus faecalis*.—The following examples are illustrative of the process and products of the present invention, but are not to be construed as limiting. All percentages are by weight, and solvent mixture proportions are by volume unless otherwise noted.

*Example 1*

A. FERMENTATION

A soil stock of *Streptomyces achromogenes* var. *rubradiris*, NRRL 3061, was used to inoculate a series of 500-ml. Erlenmeyer flasks each containing 100 ml. of sterile, preseed medium consisting of the following ingredients:

| | |
|---|---|
| Glucose monohydrate | grams__ 25 |
| Pharmamedia * | do____ 40 |
| Tap water q.s. | liter__ 1 |

*Pharmamedia is an industrial grade of cottonseed flour produced by Traders Oil Mill Company, Fort Worth, Tex.

The flasks were grown for 2 days at 28° C. on a Gump rotary shaker operating at 260 r.p.m.

Six shake flasks (600 ml.) of the preseed, described above, were used to inoculate a 378-liter seed tank containing 250 liters of sterile seed-tank medium consisting of the following ingredients:

| | |
|---|---|
| Glucoose monohydrate | g./l____ 10 |
| Pharmamedia | g./l____ 2 |
| Corn steep liquor | g./l____ 10 |
| Wilson's Peptone Liquor No. 159 * | g./l____ 10 |
| Lard oil | ml./l____ 2 |
| Tap water | Balance |

*Wilson's Peptone Liquor No. 159 is a preparation of hydrolyzed proteins of animal origin.

The seed tank medium presterilization pH was 7.2. The seed tank was grown for 24 hours at a temperature of 28° C., with aeration at a rate of 100 standard liters per minute, and agitation at a rate of 280 r.p.m.

Five percent of the seed, described above, was used to inoculate a 380-liter fermentor containing 250 liters of the following medium:

| | |
|---|---|
| Starch | g./l____ 10 |
| Corn steep liquor | g./l____ 20 |
| Distillers' solubles | g./l____ 15 |
| Sodium nitrate | g./l____ 3 |
| Lard oil | ml./l____ 2 |

The fermentor tank medium presterilization pH was 7.2. The fermentation cycle was three days during which time the temperature was controlled at 28° C., filtered air was supplied at a rate of 100 standard liters per minute, and agitation was at the rate of 280 r.p.m. Sterile lard oil was added to control foaming. Pre-harvest *S. aureus* assay was 20 mcg./ml. rubradirin. (Average dry solids— 20 mg./ml.)

B. EXTRACTION

The whole broth from the above described fermentation was slurried with 4 percent of its weight of diatomaceous earth and filtered. The filter cake was washed with 1/10 volume of water and the wash was added to the clear beer. The clear beer was adjusted to pH 3.2 with 6 N sulfuric acid and extracted with 1/2 volume of methylene chloride. The spent beer was discarded. The methylene chloride extract was washed with 1/10 volume of water; the wash was discarded. The washed methylene chloride solution was concentrated under reduced pressure. An equal volume of water was added to the concentrate and, while mixing, the pH was adjusted to 8.8 with 6 N sodium hydroxide; the phases were separated. An equal volume of methylene chloride was added to the aqueous phase, and, while mixing, the pH was adjusted to 7.4 with approximately 4 N acetic acid; the phases were separated. The organic phase was rinsed with 1/20 volume of water and the rinse discarded. The methylene chloride extract was concentrated to 1/50 volume and then poured into 2 to 5 volumes of Skellysolve B (isomeric hexanes). The amorphous powder which formed was separated by filtration, rinsed with a small amount of Skellysolve B, and dried under reduced pressure.

C. PURIFICATION

Material, prepared as above, was used as feed for a partition column which was prepared as follows:

A solvent system consisting of cyclohexane:ethyl acetate (3:1) saturated with propylene glycol was thoroughly mixed and equilibrated. The two phases were separated for individual use. Acid-washed diatomaceous earth (100 parts/unit weight of crude concentrate material described above) was slurried in 4.5 ml./gm. of upper phase of the previously described system. To this slurry was added 0.5 ml./gm. of the lower-phase/unit weight of diatomaceous earth while stirring well. This mixture was added to a 3 inch column and packed with 4 p.s.i. pressure of an inert gas. Six parts of diatomaceous earth to 1 part of starting material was slurried in 27 vol. of upper-phase. One part of starting material was dissolved in 3 vol. of lower-phase and then added to the slurry. The charge was then added to the column with the aid of a small additional amount of upper-phase, followed by a layer of sea sand. The column was developed with upper-phase and appropriate fractions, located by disc plate assay using *S. aureus,* were collected and pooled. The main pool was concentrated under reduced pressure at 35° C. bath temperature for removal of volatile solvents. The concentrate was diluted with an equal volume of water and extracted two times with 1/4 volume of methylene chloride. The methylene chloride extract was rinsed with 1/10 vol. of water, and the rinse discarded. The extract was concentrated under reduced pressure to 1/10 its volume. Five volumes of Skellysolve B were then added while stirring. The amorphous rubradirin which precipitated was collected by filtration and rinsed with Skellysolve B and dried. Further purification of this amorphous rubradirin was achieved by counter current distribution in a Craig apparatus for 200 transfers using a solvent system of Skellysolve B, acetone, and water (5:5:1). The peak fraction was isolated and the solvents removed therefrom by evaporation under reduced pressure at 32° C. The remaining aqueous solution was extracted with 100 ml. of chloroform and the extract was dried with anhydrous sodium sulfate. It was then concentrated to 5 ml. under reduced pressure and poured, with stirring, into 2 ml. of Skellysolve B. The resulting amorphous rubradirin was filtered, rinsed with Skellysolve B and dried to give a highly purified preparation of amorphous rubradirin.

*Example 2.—Sodium salt of rubradirin*

Twenty-five mg. of rubradirin as prepared in Example 1 was dissolved in several drops of acetone. To this solution was added 0.5 ml. of water and 1 drop of 6 N sodium hydroxide, followed by the addition of sufficient ether to precipitate the amorphous dark green sodium rubradirin salt.

CHEMICAL AND PHYSICAL PROPERTIES OF RUBRADIRIN

Melting point: 205–215° C.
Elemental analysis:
 C=57.31.
 H=4.69.
 O=31.36.
 N=5.25.
Empirical formula: $C_{51}H_{50}O_{21}N_4$.
Specific optical rotation: Too highly colored.
Solubility:
 Soluble in ethyl acetate, 1-butanol, methyl ethyl ketone, methylene chloride, methanol, benzene.
 Relatively insoluble in water.

Figure 2:
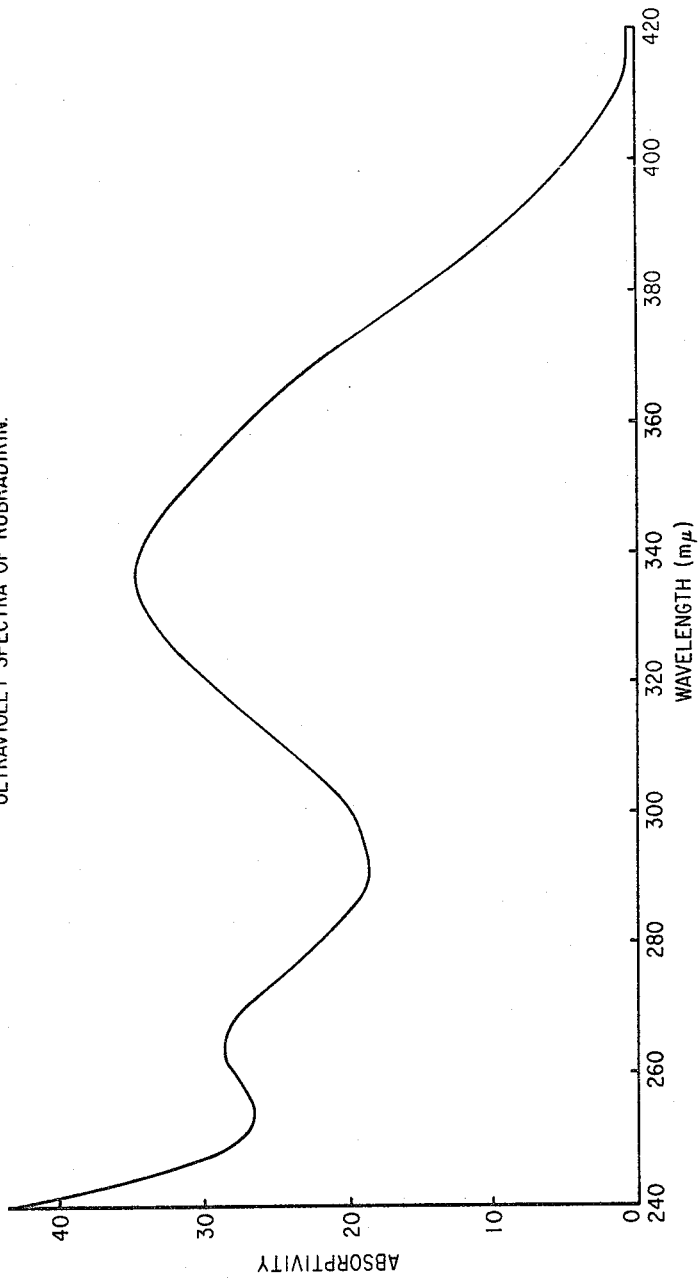

Ultraviolet spectrum: The ultraviolet absorption maxima of rubradirin as reproduced in FIGURE 2 of the drawing are:
 In dioxane:
  264 m$\mu$, a=28.48.
  337 m$\mu$, a=34.73.
  515 m$\mu$, a=1.58.

Infrared spectrum: The infrared absorption spectrum of rubradirin suspended in Nujol mull is reproduced in FIGURE I of the drawing. Rubradirin shows peaks at the following wave lengths expressed in reciprocal centimeters:

| | | | |
|---|---|---|---|
| 3550 (W) | 1544 (S) | 1103 (M) | 867 (W) |
| 3350 (W) | 1510 (M) | 1080 (S) | 847 (W) |
| 3275 (W) | 1504 (M) | 1061 (M) | 837 (W) |
| 2920 (S) (oil) | 1460 (S) (oil) | 1045 (M) | 810 (W) |
| 2845 (M) (oil) | 1476 (S) (oil) | 1030 (M) | 802 (W) |
| 1727 (M) | 1324 (S) | 1005 (M) | 790 (W) |
| 1693 (M) | 1282 (S) | 980 (W) | 780 (W) |
| 1672 (M) | 1245 (M) | 962 (W) | 755 (M) |
| 1643 (S) | 1190 (M) | 937 (W) | 732 (M) |
| 1615 (S) | 1160 (M) | 925 (W) | 715 (M) |
| 1575 (S) | 1120 (M) | 887 (W) | |

Molecular weight:

The probable molecular weight as determined from the equivalent weight is 1026±12.
 The equivalent weight from potentiometric titration is 342±4, with 3 equally functional titratable groups.
 The probable molecular weight on the basis of the presence of 5C—CH$_3$ is 1048.
 The probable molecular weight on the basis of 2OCH$_3$ is 1042.

*In vivo* activity:
 *S. aureus* infected mice, treated orally, were protected with a CD$_{50}$ of 1.77 (1.71–1.83) mg./kg. dose of rubradirin.

We claim:
1. Rubradirin, a compound which
 (a) is effective in inhibiting the growth of various Gram-positive and Gram-negative bacteria;
 (b) is soluble in ethyl acetate, 1-butanol, methyl ethyl ketone, methylene chloride, methanol, and benzene; and relatively insoluble in water;
 (c) has the following elemental analysis: C, 57.31; H, 4.69; N, 5.25; O, 31.36;
 (d) has a molecular weight of 1026±12;
 (e) has a characteristic ultraviolet absorption spectrum as follows:
  In dioxane:
   264 m$\mu$, a=28.48;
   337 m$\mu$, a=34.73;
   515 m$\mu$, a=1.58;
  and as shown in FIGURE II of the drawing;
 (f) has a characteristic infrared absorption spectrum as shown in FIGURE I of the accompanying drawing;

(g) has a melting point of 205–215° C.; and
(h) has an empirical formula $C_{51}H_{50}O_{21}N_4$.

2. Rubradirin as defined in claim 1, in its essentially pure form.

3. A composition of matter assaying at least 1.0 mcg./mg. of rubradirin, a compound characterized in claim 1.

4. A compound selected from the group consisting of rubradirin, according to claim 1, and salts thereof with alkali metal, alkaline earth metals, and amines.

5. Sodium salt of the compound identified in claim 1.

6. A process which comprises cultivating *Streptomyces achromogenes* var. *rubradiris* in an aqueous nutrient medium under aerobic conditions until substantial antibiotic activity is imparted to said medium by production of rubradirin.

7. A process which comprises cultivating *Streptomyces achromogenes* var. *rubradiris* in an aqueous nutrient medium containing a source of assimilable carbohydrate and assimilable nitrogen under aerobic conditions until substantial antibiotic activity is imparted to said medium by production of rubradirin and isolating the rubradirin so produced.

8. A process according to claim 7 in which the isolation comprises filtering the medium, extracting the filtrate with a water-immiscible solvent for rubradirin, and recovering rubradirin from the solvent extract.

9. A process which comprises cultivating *Streptomyces achromogenes* var. *rubradiris* in an aqueous nutrient medium under aerobic conditions until substantial antibiotic activity is imparted to said medium by production of rubradirin and isolating rubradirin from the culture medium.

References Cited

Bhuyan et al.: Chem. Abst., vol. 63, 1965, pp. 3578h and 3579a.

SAM ROSEN, *Primary Examiner.*